United States Patent [19]
Mathis

[11] 3,978,886

[45] Sept. 7, 1976

[54] BACKFLOW SAFETY VALVE FOR THERAPY POOLS

[76] Inventor: Cleo D. Mathis, 1808 Potrero Ave., South El Monte, Calif. 91733

[22] Filed: June 25, 1975

[21] Appl. No.: 590,035

[52] U.S. Cl. .......................... 137/565; 137/533.17; 4/172.16
[51] Int. Cl.² ..................... F16K 15/02; A47K 3/10
[58] Field of Search .......... 137/535, 540, 542, 536, 137/543.19, 543.21, 533.17, 533.19, 565; 4/172.16

[56] References Cited
UNITED STATES PATENTS

| | | |
|---|---|---|
| 776,377 | 11/1904 | Beers .............................. 137/533.19 |
| 2,845,945 | 8/1958 | Manousi, Jr. .................... 137/542 X |
| 3,036,594 | 5/1962 | Salisbury ..................... 137/543.19 X |
| 3,414,003 | 12/1968 | Wyckoff .................... 137/533.19 X |
| 3,457,949 | 7/1969 | Coulter ......................... 137/543.21 |
| 3,580,275 | 5/1971 | Hanson et al. ..................... 137/540 |
| 3,664,371 | 5/1972 | Schneider .................. 137/543.19 X |
| 3,915,450 | 10/1975 | Flewwelling et al. .............. 4/172.16 |

*Primary Examiner*—William R. Cline
*Attorney, Agent, or Firm*—Robert C. Comstock

[57] ABSTRACT

A valve which is particularly adapted for use as a backflow safety valve for therapy pools, in which it prevents water from flowing through the air supply line and damaging the air blower. When the water outlets of the therapy pool are temporarily blocked, water which is forced into the air supply line by water pressure flows into the open end of a cup shaped valve member and moves it to closed position within the air supply line. The safety valve will automatically re-open when the blockage is removed.

1 Claim, 4 Drawing Figures

BACKFLOW SAFETY VALVE FOR THERAPY POOLS

BACKGROUND OF THE INVENTION

1. Field of the Invention:

The invention relates to a valve which is particularly adapted for use as a backflow safety valve for a therapy pool or the like.

2. Description of the Prior Art:

In therapy pool installations of the type now in use, an air supply pipe extends around the pool through which air is circulated to operate a plurality of whirlpool jet outlets by venturi action. Air is circulated through the air pipe by an air blower. It is sometimes possible for water to enter the air pipe from the jet outlets. This is likely to occur if one or particularly more than one of the jet outlets should become blocked either intentionally or inadvertently. In such instances, the water pressure will force water into the air supply pipe because the normal water outlet is blocked.

Persons using the therapy pools are sometimes inclined to place their hands or bodies against the jet outlets and may thereby block them intentionally or inadvertently. In such case, water is forced into the air supply pipe and is likely to travel along the pipe to the air blower, which it will damage.

SUMMARY OF THE INVENTION

The invention relates to a valve which is particularly adapted for use as a backflow safety valve in therapy pool installations, in which it functions to prevent water from traveling along the air supply pipe or line and causing damage to the air blower.

In essence, the invention contemplates a safety valve structure which is mounted in the air pipe, preferably adjacent to the return to the air blower. The valve includes a valve member which is movable to closed position by water flowing through the air pipe. In particular, the valve utilizes a cup-shaped valve member in which the water enters the hollow interior of the cup and moves it longitudinally along the air pipe to closed engagement with an annular valve seat.

It is the primary object of the invention to provide a backflow safety valve for therapy pools which will prevent damage to the air blower caused by water entering the air supply line.

It is a more particular object of the invention to provide such a valve which is simple in its structure and simple and sure in operation.

Another object of the invention is to provide such a valve which will function automatically to prevent water damage to the air blower and which will release automatically when the danger of such damage has been averted.

It is another object of the invention to provide such a valve in which the movable valve member has a hollow cup-shape so that the water will enter its hollow interior to provide movement of the valve member into engagement with the valve seat.

It is also among the objects of the invention to provide a valve of the type described which is economical to manufacture and install.

Another object of the invention is to provide a valve structure which is capable of other uses as well, including use in a water line as well as an air line.

Still another object of the invention is to provide a valve of the type described which is dimensioned so that its outer diameter fits one standard size of pipe and its inner diameter fits another standard size of pipe, so that the same valve is usable with two different standard size of pipe.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE PREFERRED EMBODIMENT

Figure 1:
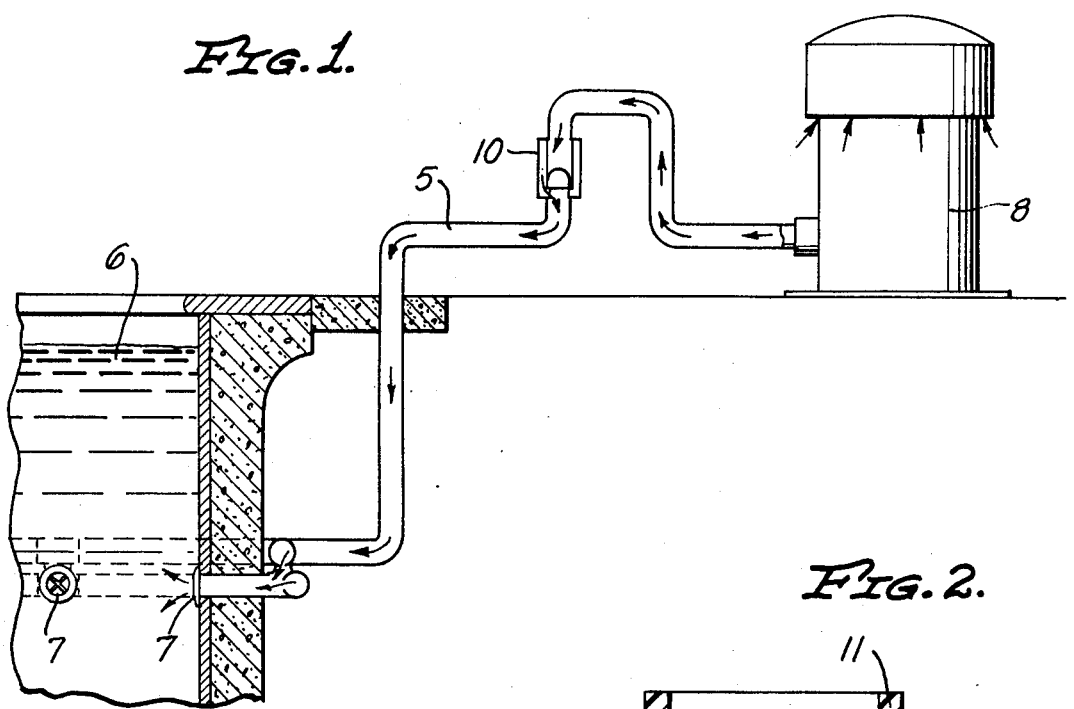
FIG. 1 is a schematic view showing the use of the backflow safety valve in the air supply line between the pool air pipe and the air blower.
Figure 2:
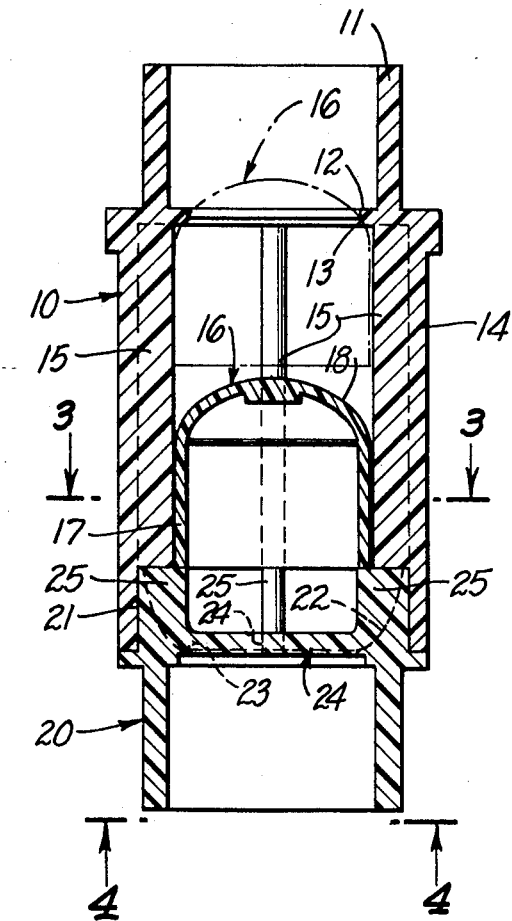
FIG. 2 is a longitudinal sectional view of the valve in use in open position, with the closed position of the cup shown in phantom lines.
Figure 3:
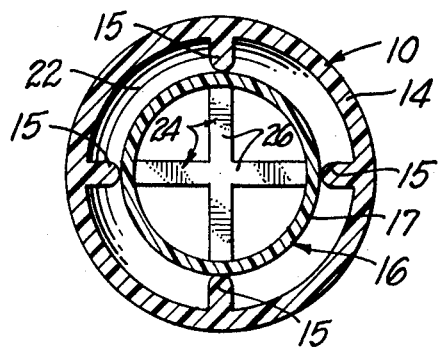
FIG. 3 is a transverse sectional view of the same taken on line 3—3 of FIG. 2.
Figure 4:
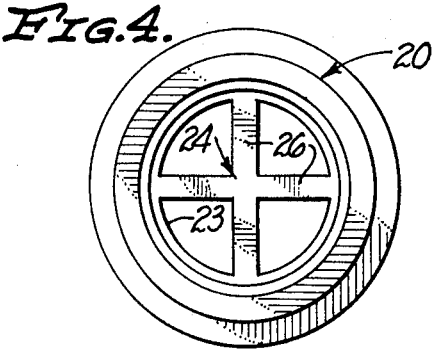
FIG. 4 is a sectional view of the same taken on line 4—4 of FIG. 2.

The valve of the present invention is adapted to be inserted into the air supply pipe 5 of a therapy pool 6 which has a plurality of venturi type whirlpool jet water outlets 7. The air supply pipe 5 extends around the therapy pool 6 to supply air to each of the water outlets 7. The valve comprises a valve body 10 which is preferably mounted within the air supply pipe 5 between the water outlets 7 and an air blower 8 which circulates air through the air supply pipe 5.

Adjacent one end of the valve body 10 is an outlet 11. A flange 12 extends radially inwardly at the inner end of the outlet 11. The inner edge of the flange 12 is provided with beveling which defines an annular valve seat 13.

The midportion 14 of the valve body is somewhat larger diametrically than the outlet 11. Extending longitudinally along its inner side walls are four evenly spaced inwardly directed ridges 15. The inner edges of the ridges 15 are rounded in order to reduce friction. One end of the ridge 15 intersects the flange 12. The other end of each of the ridges 15 is spaced inwardly from the opposite end of the valve body 10.

The valve member, which comprises a hollow cup 16, is freely mounted within the valve body 10, but is shaped so that the outer diameter of its side walls 17 is only slightly less than the distance between the inner edges of the opposed ridges 15. The cup 16 is accordingly restricted by the ridges is against substantially any movement other than longitudinal axial movement within the midportion 14 of the valve body 10.

The cup 16 is preferably formed of somewhat soft or resilient material and has a round hemispherical end 18 which is adapted to fit within and make a resilient sealing engagement with the valve seat 13 when the cup 16 is moved into engagement therewith. The side walls 17 of the valve member 16 are preferably straight and elongated so that the valve member 16 cannot substantially cant or tip during its longitudinal movement within the valve body 10.

Mounted on the opposite end of the valve body 10 from the outlet 11 is an end cap 20. The end cap 20 has a flange 21 which slidably fits within the end of the valve body 10. The inner edge of the flange 21 is disposed directly adjacent to the ends of the ridges 15.

The inside of the flange 21 is inwardly curved at 22 to a fluid inlet 23 of smaller diameter. Extending diametrically across the end cap 20 adjacent the midportion thereof are a pair of intersecting cross pieces 24. The ends of the cross pieces 24 are substantially flush with the edge of the flange 21.

The cross pieces 24 have side portions 25 which extend along the inwardly curved portion 22 and center portions 26 which extend transversely across the open center of the end cap 20. The inner surface of the side portions 25 are rounded and are curved as they merge with the center portions 26. In use, the backflow safety valve comes into operation if the jet water outlets 7 are blocked in such a manner as to cause the water supply pressure to drive water into the air supply pipe 5. When the water is moved along the air supply pipe 5 toward the air blower 8, it will enter the hollow open end of the cup 16 and cause the cup 16 to move longitudinally within the valve body 10. The closed end of the cup 16 will be moved into sealing engagement with the valve seat 13 to prevent any flow of water beyond it to the air blower 8. The valve thereby prevents water from reaching and damaging the air blower 8.

As soon as the water outlets 7 are again open, the water within the air supply pipe 5 will begin to flow out of the water outlets 7 and in the opposite direction within the air supply pipe 5, away from the air blower 8. Pressure from the air blower 8 will then move the cup 16 away from the valve seat 13 and re-open the safety valve.

The outlet 11 of the valve body 10 and the portion of the end cup 20 which projects from the opposite end of the valve body 10 are both preferably dimensioned so that a standard 2 inch size of pipe will fit around their outer diameters and a standard 1 ½ inch size of pipe will fit within their inner diameters. The same valve can accordingly be installed and used in either of 1 ½inch or a 2 inch installation.

I claim:

1. An air supply system for a therapy pool comprising an air supply blower, an air supply line connected to and supplied with air from said blower, a plurality of water outlets connected to said air supply line for projecting water into said pool, said water outlets being of the type in which blockage of said water outlets may cause water to enter said air supply line under pressure from a water supply line, a backflow safety valve, said valve being fully automatic in operation, said valve comrising a cylindrical body connected at its opposite ends in a vertical position within said air supply line between said water outlets and said air supply blower, said valve having a valve member comprising an inverted cup mounted for longitudinal movement within said valve body, said cup having a closed end adapted to engage an annular valve seat formed within said valve body adjacent to the closed end of said cup, said cup normally being disposed in an open downward position, said cup being movable upwardly by the pressure of water flowing through said air supply line and into the open end of said cup to move said cup longitudinally upwardly within said valve body into sealing engagement with said valve seat to prevent water from reaching and damaging said air supply blower, said cup automatically returning downwardly to open position upon the flow of water out of said cup.

\* \* \* \* \*